3,334,101
DEMETHYLATION OF PYRIDINE COMPOUNDS
Richard C. Myerly and Kurt Weinberg, Charleston, W. Va., assignors to Union Carbide Corporation, a corporation of New York
No Drawing. Filed Sept. 14, 1964, Ser. No. 396,404
12 Claims. (Cl. 260—283)

The instant invention relates to a novel process for effecting the substitution of a pyridine ring. This invention specifically provides a novel method for dealkylation, particularly for demethylation of a broad spectrum of methyl substituted pyridine compounds. In a particular aspect this invention provides a novel process for the preparation of 3-ethylpyridine.

Heretofore various processes have been disclosed for the dealkylation of pyridine compounds. These processes almost invariably resorted to very high temperatures and high pressure to achieve catalytic dealkylation. Furthermore, the yields from prior art processes have been most often very low. This fact coupled with the temperature and pressure process disadvantages have rendered direct dealkylation of pyridine too uneconomical for use on a commercial level.

Particularly with regard to 3-ethylpyridine, an attractive pharmaceutical and chemical intermediate, the instant process offers a novel and economical preparative route by direct dealkylation of 2-methyl-5-ethylpyridine. Moreover, the novel process of this invention enables the selective demethylation of a broad spectrum of pyridine compounds by a single process route.

The novel process of this invention provides a useful and economic process to directly, selectively demethylate a pyridine ring. Applicants' copending application Ser. No. 396,407 filed Sept. 14, 1964, provides a novel process for selectively adding methyl groups to a pyridine ring using a catalyst similar to that employed in the instant novel process.

In accordance with the invention there is accordingly provided a novel process for selectively demethylating methyl substituted pyridine compounds by contacting the pyridine compounds with hydrogen or steam at moderately elevated temperatures in the presence of a nickel-nickel oxide catalyst. Owing to the directive effect of the heterocyclic nitrogen atom of the pyridine compound the dealkylation takes place primarily at the positions alpha, (i.e., adjacent) to the heterocyclic nitrogen atom. Thus, for example, the demethylation of an alkyl substituted pyridine ring will proceed by substitution at the 2 and 6 positions on the pyridine ring itself.

According to the process of this invention, a demethylation is effected at the alpha position of a pyridine ring and accordingly the starting materials are characterized by at least one methyl group in one of these positions adjacent to the heterocyclic pyridyl nitrogen atom. Thus, the pyridine compounds useful in the novel process of this invention contain at least one integral pyridine ring alone or as part of a fused polycyclic structure comprising at least one and up to two integral pyridine rings. These structures include the basic pyridine ring, a polycyclic structure wherein the pyridine ring is fused to a homocarbocyclic ring such as quinoline, isoquinoline, and the pyridines, e.g., 5(H)-1-pyridine and the like, and structures wherein two pyridine rings are fused together such as the naphthyridines, e.g., 1,5-naphthyridine, 1,6-naphthyridine, 1,7 - naphthyridine, 1,8 - naphthyridine, 2,6-naphthyridine, 2,7-naphthyridine, and the like. It is understood that the useful starting materials are the α-methyl substituted derivatives of the above compounds, however it is pointed out that these compounds may be additionally substituted, preferably with alkyl groups, in other positions. Such larger alkyl groups remain for the most part completely unaffected by the demethylation. Highly preferably these alkyl groups contain up to 4 carbon atoms. These preferred pyridine compounds may therefore be characterized as consisting of carbon, hydrogen and one to two heterocyclic nitrogen atoms corresponding to the number of fused pyridine rings in the compound.

Thus the novel process of the instant invention provides a method for the substitution of a hydrogen atom for a methyl group at one or both positions adjacent to the heterocyclic nitrogen atom of the above pyridine compounds. A lesser amount of demethylation may be observed at the position gamma to the heterocyclic nitrogen atom, however, this will usually occur only after substitution at the positions adjacent the heterocyclic nitrogen atom has been effected. Therefore, by the instant process it is possible to proceed from 2,6-lutidine to pyridine. In the following table various exemplary starting materials having methyl groups adjacent to one heterocyclic nitrogen are listed together with the "demethylated," hydrogen substituted counterparts which may be produced therefrom by the instant process. The list is illustrative and not limiting inasmuch as it is deemed within the skill of the chemist to extrapolate the principles embodied herein so as to produce other compounds from analogous starting materials.

| Starting material | Product |
|---|---|
| α-Picoline | Pyridine. |
| 2,6-lutidine | α-Picoline. |
| 2,4-lutidine | γ-Picoline |
| 2,4,6-trimethylpyridine | 2,4-lutidine. |
| 2-methyl-5-ethylpyridine | 3-ethylpyridine. |
| 2-methyl-3-ethylpyridine | 3-ethylpyridine. |
| 2-methyl-5-propylpyridine | 3-propylpyridine. |
| 2-methyl-4-butylpyridine | 4-butylpyridine. |
| 2-methylquinoline | Quinoline. |
| 2-methyl-8-ethylquinoline | 8-ethylquinoline. |
| 1-methylisoquinoline | Isoquinoline. |
| 1,3-dimethylisoquinoline | 3-methylisoquinoline. |
| 2-methyl-1,8-naphthyridine | 1,8-naphthyridine. |
| 2-methyl-4-butyl-1,8-naphthyridine | 4-butyl-1,8-naphthyridine. |
| 2,7-dimethyl-1,8-naphthyridine | 2-methyl-1,8-naphthyridine. |
| 2-methyl-5(H)-1-pyridine | 5(H)-1-pyridine. |

The novel process is carried out by contacting the pyridine compound having at least one methyl group adjacent to heterocyclic nitrogen with steam or hydrogen in the vapor phase in the presence of a catalyst of nickel and nickel oxide.

When hydrogen is employed it is preferable to dilute the hydrogen stream with an inert carrier gas such as nitrogen. Other inert diluents may also be employed with the hydrogen, such as for example the noble gases (argon, neon, xenon and the like), or carbon dioxide. Any inert carrier which is gaseous at the process temperature may be employed. For reasons of cost, nitrogen is preferred.

Hydrogen is preferably supplied to the reaction in amounts so as to provide one mole of hydrogen per molar equivalent of methyl groups to be substituted with hydrogen in the process. Thus, for example, to produce pyridine from α-picoline a mole ratio of approximately one mole of hydrogen per mole of α-picoline is employed. Whereas if it is desired to produce pyridine from 2,6-lutidine in one step, a mole ratio of approximately two moles of hydrogen per mole of 2,6-lutidine is used. Hydrogen may be used in excess of the molar equivalent needed in the reaction, however, no appreciable advantage is observed and in fact in some instances an increase of the ratio of hydrogen to pyridine compound resulted in a decrease in yield.

As hereinbefore pointed out the incoming hydrogen is preferably diluted with an inert carrier gas such as nitrogen. The volumetric ratio of nitrogen to hydrogen may range from 500:1 to 1:1. Preferably the nitrogen/hydrogen ratio is maintained at from 10:1 to about 40:1.

When steam is employed as the demethylating reactant in the novel process no carrier gas need be employed and the steam is preferably maintained in a molar excess. The process is operable using a very wide range mole ratio of reactants from as low as 1:1 to as high as 500:1, steam being in excess. Optimum results are most often achieved using a steam pyridine ratio of from 10:1 to 40:1.

The dealkylation according to the instant invention takes place in the presence of a nickel-nickel oxide catalyst. Suitable catalysts include stabilized nickel and nickel oxide containing less than 50 percent and preferably about 20 to 30 percent free nickel and are preferably employed in finely divided form. The catalysts may be prepared by partial reduction of nickel oxide. The catalyst is preferably employed with a gross support such as kieselguhr, silica, clay or the like, but it is also extremely effective if used alone without support. The specificity of the nickel-nickel oxide catalysts for the instant dealkylation reaction was singular and surprising, since the use of other catalysts, such as nickel alone on kieselguhr, or nickel and chromium oxide failed to result in even half the yield of the instant catalyst although higher temperatures were employed. Other catalysts, such as nickel on montmorillonite, copper, cobalt on alumina, and barium promoted with copper chromite produced at best traces of the desired demethylated product.

The reaction is conducted in the vapor phase at elevated temperatures whether steam or hydrogen is used. Depending upon the reactants employed the temperature may range between about 180° C. to about 300° C. For the dealkylation with steam or with hydrogen it is preferred to operate at a temperature of from about 250° to 300° C.

The instant dealkylation is admirably suited to continuous operation by continuously passing the reactants, in the vapor phase, over the catalyst bed. The contact time is wholly non-critical to the reaction itself and may vary over a wide range. Contact time of 50 seconds or higher may be used although most often the best results are achieved with a contact time of from 2 to 15 seconds. However, the optimum contact time will depend upon the reactants themselves as well as the other interrelated process variables such as the ratio of reactant, the temperature and the like.

Pressure is not critical to the reaction and the process may be conducted at subatmospheric, atmospheric or superatmospheric pressure. When steam is used in the dealkylation, operation at superatmospheric pressures has a slightly beneficial effect upon yield when a low mole ratio of steam/pyridine compound is employed. However, the effect of pressure is not pronounced and while operation at pressures higher than atmospheric may be desirable process-wise, operation at below atmospheric pressure results in no observable advantage.

The following examples are illustrative.

EXAMPLE I

Dealkylation of 2-methyl-5-ethylpyridine 2-methyl-5-ethylpyridine was vaporized in a preheater and the vapors were admitted to a tubular reactor containing nickel-nickel oxide catalyst, said reactor having a length of 3 feet and an inside diameter 1¼ inches. A mixture of nitrogen and hydrogen in a volumetric ratio of 47:1 was also admitted to the reactor in such amount as to provide a 1:1 mole ratio between hydrogen and 2-methyl-5-ethylpyridine. The catalyst was maintained at 258 to 261° C. and the contact time of the reactants over the catalyst was 5.2 seconds. The exiting vapors were condensed, collected and distilled through a fractionating column yielding 3-ethylpyridine in an amount corresponding to 40 percent of theoretical yield; 47.5 percent of the 2-methyl-5-ethylpyridine fed to the reactor was recovered. Further analysis of the product revealed that about 2 percent of 2-methyl-5-ethyl pyridine had been converted into other pyridine compounds such as α-picoline, β-picoline, pyridine and 2,5-lutidine.

EXAMPLES II–VI

Various pyridine compounds were dealkylated employing a procedure and equipment similar to that in Example I. Results are summarized in Table I.

TABLE I.—DEALKYLATION OF PYRIDINE COMPOUNDS USING HYDROGEN:NITROGEN MIXTURE

| Example | Starting Pyridine Compound | Ratio $N_2$:$H_2$ Pyridine Cpd. | Catalyst Temp., ° C. | Contact Time, Sec. | Products | Yield, Percent of Theory |
|---|---|---|---|---|---|---|
| II | 2,6-lutidine | 43:2.1:1 | 265-6 | 6.1 | Pyridine<br>α-Picoline | 7.9<br>19.0 |
| III | 2,4-lutidine | 21:1:1 | 265 | 6.0 | α-Picoline | 36.0 |
| IV | 2,4,6-trimethylpyridine | 22:1:1:1 | 265 | 6 | 2,4-lutidine<br>α-Picoline | 24.0<br>14.7 |
| V | α-Picoline | 23:1:1:1 | 265 | 6 | Pyridine | 18.4 |
| VI | 2-methyl-5-ethylpyridine[1] | 23:1:1 | 326-330 | 4.4 | 3-ethylpyridine | 15.0 |

[1] Used catalyst of nickel on alumina.

In Example VI a nickel on alumina catalyst was employed, and although the temperature was maintained at about 330° C. only a 15 percent yield of 3-ethylpyridine was obtained as compared with the 40 percent yield obtained using the nickel/nickel oxide catalyst of the invention in Example I.

EXAMPLE VII

A mixture of water and 2-methyl-5-ethyl-pyridine in a mole ratio of 43:1 was vaporized in a preheater. The vapors were passed over a catalyst of nickel/nickel oxide maintained in an externally heated tubular reactor having a length of 3 feet and an inside diameter of 1¼ inches. The catalyst temperature was 290° C. Contact time was 3.2 seconds. The exiting vapors were condensed and collected. After the aqueous layer, resulting from the steam, had been made strongly alkaline, it was separated from the organic layer and extracted with benzene. The benzene extract was added to the organic layer which was distilled to yield 3-ethylpyridine in an amount corresponding to a 50 percent yield based on the theoretical. 46.3 percent of the 2-methyl-5-ethylpyridine fed to the reactor was recovered unreacted. Further analysis of the products revealed that about 3 percent of the 2-methyl-5-ethylpyridine feed had been converted to other pyridine compounds such as α-picoline, β-picoline, pyridine, and 2,5-lutidine.

EXAMPLES VIII–X

Various other pyridine compounds were dealkylated using steam employing a procedure and equipment similar to Example VII. Results are summarized in Table II.

TABLE II.—DEALKYLATION OF PYRIDINE COMPOUNDS USING STEAM

| Example | Starting Pyridine Cpd. | Mole Ratio H₂O Pyridine Cpd. | Catalyst Temp., °C. | Contact Time, Sec. | Products | Yield, Percent of Theory |
|---|---|---|---|---|---|---|
| VIII | 2,6-lutidine | 19:1 | 260-2 | 6.6 | Pyridine / α-Picoline | 14.2 / 35.0 |
| IX | 2,4-lutidine | 18.6:1 | 258-262 | 6.65 | α-Picoline | 29.0 |
| X | 2,4,6-trimethylpyridine | 22.7:1 | 263-4 | 6.4 | α-picoline / 2,4,-lutidine | 18.5 / 12.1 |

What is claimed is:

1. A process for selectively substituting a hydrogen atom for a methyl group in at least one of the positions adjacent to the heterocyclic nitrogen atom of a pyridine compound containing at least one pyridine ring which comprises contacting said pyridine compound with a member of the group consisting of hydrogen or steam in the presence of a catalyst of nickel and nickel-oxide at a temperature of from about 180° to about 360° C.

2. A process for selectively substituting a hydrogen atom for a methyl group in at least one of the positions adjacent to the heterocyclic nitrogen atom of a pyridine compound containing at least one and up to two integral pyridine rings, said pyridine compound consisting of carbon, hydrogen and up to two heterocyclic nitrogen atoms corresponding to the number of pyridine rings, which comprises contacting said pyridine compound with a member selected from the group consisting of hydrogen and steam in the presence of a catalyst of nickel and nickel-oxide at a temperature of from about 180° to about 360° C.

3. A process for selectively substituting a hydrogen atom for a methyl group in at least one of the positions adjacent to the heterocyclic nitrogen atom in an alkyl substituted pyridine which comprises contacting said alkyl substituted pyridine with a member of the group consisting of hydrogen and steam in the presence of a catalyst of nickel and nickel-oxide at a temperature of from about 180° to about 360° C.

4. A process for selectively substituting a hydrogen atom for a methyl group in at least one of the positions adjacent to the heterocyclic nitrogen atom in a pyridine compound selected from the group consisting of the alkyl substituted derivatives of quinoline, isoquinoline, the naphthyridines and the pyridines which comprises contacting said pyridine compound with a member selected from the group consisting of hydrogen and steam in the presence of a catalyst of nickel and nickel-oxide at a temperature of from about 180° to about 360° C.

5. A process for selectively substituting a hydrogen atom for a methyl group in at least one of the positions adjacent to the heterocyclic nitrogen atom in an alkyl substituted pyridine which comprises contacting said alkyl substituted pyridine with an equimolar amount of hydrogen, said hydrogen being diluted with an inert carrier gas present in a ratio of from 1:1 to 500:1 based on the volume of the hydrogen in the presence of a catalyst of nickel and nickel-oxide at a temperature of from about 180° to about 360° C.

6. A process for selectively substituting a hydrogen atom for a methyl group in at least one of the positions adjacent to the heterocyclic nitrogen atom in an alkyl substituted pyridine which comprises contacting said alkyl substituted pyridine with steam in a molar ratio of from 1:1 to 500:1 mols of steam per mol of alkyl pyridine in the presence of a nickel and nickel-oxide catalyst at a temperature of about 180° to about 360° C.

7. A process for selectively substituting a hydrogen atom for a methyl group in at least one of the positions adjacent to the heterocyclic nitrogen atom in a pyridine compound containing at least one and up to two integral pyridine rings, said compound consisting of carbon, hydrogen and up to two heterocyclic nitrogen atoms corresponding to the number of pyridine rings, which comprises contacting said pyridine compound with a member selected from the group consisting of hydrogen and steam in the presence of a catalyst of supported nickel and nickel-oxide containing less than 50 percent by weight of free nickel at a temperature of from about 250° to about 300° C.

8. A process for the production of 3-ethylpyridine which comprises contacting 2-methyl-5-ethylpyridine and a member selected from the group consisting of hydrogen and steam in the presence of a catalyst of nickel and nickel-oxide at a temperature of from about 180° to about 360° C.

9. A process for the production of pyridine which comprises contacting α-picoline with a member of the group consisting of hydrogen and steam in the presence of a catalyst of nickel and nickel-oxide at a temperature of from about 250° to about 320° C.

10. A process for the production of γ-picoline which comprises contacting 2,4-lutidine and a member selected from the group consisting of hydrogen and steam in the presence of a catalyst of nickel and nickel-oxide at a temperature of from about 180° to about 360° C.

11. A process for the production of β-picoline which comprises contacting a compound selected from the group consisting of 2,3-lutidine and 2,5-lutidine and a member selected from the group consisting of hydrogen and steam in the presence of a catalyst of nickel and nickel-oxide at a temperature of from about 180° to about 360° C.

12. A process of the production of quinoline which comprises contacting 2-methyl and a member selected from the group consisting of hydrogen and steam in the presence of a catalyst of nickel and nickel-oxide at a temperature of from about 180° to about 360° C.

No references cited.

ALEX MAZEL, *Primary Examiner.*

DONALD G. DAUS, *Assistant Examiner.*

UNITED STATES PATENT OFFICE

CERTIFICATE OF CORRECTION

Patent No. 3,334,101  August 1, 1967

Richard C. Myerly et al.

It is hereby certified that error appears in the above numbered patent requiring correction and that the said Letters Patent should read as corrected below.

Columns 3 and 4, TABLE I, third column, lines 3 and 4, for "22:1:1:1" and "23:1:1:1" read -- 22:1.1:1 -- and -- 23:1.1:1 --; same TABLE I, sixth column, lines 2, 3 and 5 thereof, and columns 5 and 6, TABLE II, sixth column, lines 2, 3 and 4 thereof, for "α-Picoline", each occurrence, read -- γ-Picoline --.

Signed and sealed this 20th day of August 1968.

(SEAL)
Attest:

Edward M. Fletcher, Jr.  EDWARD J. BRENNER
Attesting Officer  Commissioner of Patents